United States Patent
Tamai et al.

(10) Patent No.: US 7,669,569 B2
(45) Date of Patent: Mar. 2, 2010

(54) CRANKSHAFT STOP POSITIONING CONTROL SYSTEM

(75) Inventors: Goro Tamai, West Bloomfield, MI (US); Mark A. Zerbini, Canton, MI (US); James L. Worthing, Munith, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 444 days.

(21) Appl. No.: 11/626,469

(22) Filed: Jan. 24, 2007

(65) Prior Publication Data

US 2007/0295297 A1   Dec. 27, 2007

Related U.S. Application Data

(60) Provisional application No. 60/816,684, filed on Jun. 27, 2006.

(51) Int. Cl.
*F02N 11/00* (2006.01)
*B60K 6/34* (2007.10)

(52) U.S. Cl. ............... 123/179.4; 180/65.28; 903/905

(58) Field of Classification Search ............ 123/179.4, 123/179.3; 180/65.21, 65.27, 65.28, 65.285, 180/65.275, 65.31; 903/905
See application file for complete search history.

(56) References Cited

U.S. PATENT DOCUMENTS

| | | | |
|---|---|---|---|
| 6,192,847 B1 * | 2/2001 | Davis ..................... | 123/179.4 |
| 6,453,864 B1 * | 9/2002 | Downs et al. ............ | 123/179.3 |
| 6,674,261 B2 * | 1/2004 | Takahashi et al. ........... | 318/721 |
| 6,681,173 B2 * | 1/2004 | Turner et al. ................ | 701/113 |
| 6,778,899 B2 * | 8/2004 | Weimer et al. .............. | 701/115 |
| 6,807,934 B2 * | 10/2004 | Kataoka et al. .......... | 123/179.4 |
| 6,834,632 B2 * | 12/2004 | Kataoka et al. .......... | 123/179.4 |
| 7,066,128 B2 * | 6/2006 | Satake et al. ............. | 123/179.4 |
| 7,079,939 B2 * | 7/2006 | Kataoka et al. ............. | 701/112 |
| 7,204,222 B2 * | 4/2007 | Yamauchi et al. ......... | 123/179.4 |
| 7,261,076 B2 * | 8/2007 | Hoevermann ............ | 123/179.4 |
| 2002/0093202 A1 * | 7/2002 | Downs et al. ............. | 290/40 R |
| 2004/0149247 A1 * | 8/2004 | Kataoka et al. .......... | 123/179.4 |
| 2005/0188939 A1 * | 9/2005 | Iwatsuki et al. .......... | 123/179.4 |
| 2005/0229889 A1 * | 10/2005 | Hoevermann ............ | 123/179.4 |
| 2005/0278109 A1 * | 12/2005 | Ando ......................... | 701/112 |
| 2006/0048734 A1 * | 3/2006 | Kataoka et al. .......... | 123/179.4 |
| 2007/0099749 A1 * | 5/2007 | Zillmer et al. ................. | 477/3 |
| 2007/0151536 A1 * | 7/2007 | Yamauchi et al. ........ | 123/179.4 |

* cited by examiner

*Primary Examiner*—Stephen K Cronin
*Assistant Examiner*—Arnold Castro

(57) ABSTRACT

A method of regulating a crankshaft position in a hybrid electric vehicle includes deactivating cylinders of an internal combustion engine, driving a crankshaft of the internal combustion engine using an electric machine, and determining a target crankshaft position when a rotational speed of the crankshaft crosses a first threshold. The crankshaft is driven towards the target crankshaft position at a nudge rotational speed, and rotation of the crankshaft is braked using the electric machine when a brake crankshaft position is achieved at the target rotational speed. Rotation of the crankshaft is arrested at the target position.

22 Claims, 3 Drawing Sheets

CRANKSHAFT STOP POSITIONING CONTROL SYSTEM

CROSS-REFERENCE TO RELATED APPLICATIONS

This application claims the benefit of U.S. Provisional Application No. 60/816,684, filed on Jun. 27, 2006. The disclosure of the above application is incorporated herein by reference.

FIELD OF THE INVENTION

The present invention relates to hybrid vehicles, and more particularly to crankshaft stop positioning control system for a hybrid vehicle.

BACKGROUND OF THE INVENTION

Hybrid vehicles are driven by multiple powerplants including, but not limited to an internal combustion engine and an electric machine. The electric machine functions as a motor/generator. In a generator mode, the electric machine is driven by the engine to generate electrical energy used to power electrical loads or charge batteries. In a motor mode, the electric machine supplements the engine, providing drive torque to drive the vehicle drivetrain.

In hybrid electric vehicles, the engine is often stopped and started to improve fuel economy. Acceleration and deceleration of the engine crankshaft should be controlled during engine stop and starts to reduce driveline oscillations and other vibration inducing events that diminish the vehicle drivability. The crankshaft should also be parked in a desirable rotational position to further improve the stop-start characteristics of the engine.

SUMMARY OF THE INVENTION

Accordingly, the present invention provides a method of regulating a crankshaft position in a hybrid electric vehicle. The method includes deactivating cylinders of an internal combustion engine, driving a crankshaft of the internal combustion engine using an electric machine, and determining a target crankshaft position when a rotational speed of the crankshaft crosses a first threshold. The crankshaft is driven towards the target crankshaft position at a nudge rotational speed, and rotation of the crankshaft is braked using the electric machine when a brake crankshaft position is achieved at the target rotational speed. Rotation of the crankshaft is arrested at the target position.

In one feature, the step of driving the crankshaft includes driving the crankshaft at a lash rotational speed to minimize driveline lash in the hybrid electric vehicle.

In another feature, the method further includes determining a braking torque of the electric machine based on a difference between an actual crankshaft position and the target crankshaft position during the step of braking.

In another feature, the method further includes adjusting a torque of the electric machine to provide a slight motoring of the crankshaft when the actual crankshaft position is approximately equal to the target crankshaft position.

In another feature, the method further includes adjusting a torque of the electric machine to provide a slight motoring of the crankshaft when the rotational speed of the crankshaft is approximately equal to zero.

In still another feature, the method further includes ramping a torque of the electric machine to zero when the actual crankshaft position is equal to the target crankshaft position.

In yet other features, the method further includes determining respective rotational speeds of the crankshaft and the electric machine, and relaxing a throttle actuator of the internal combustion engine when the respective rotational speeds each equal zero. A timer is initiated when the respective rotational speeds both equal zero. The step of relaxing is executed upon the timer achieving a threshold time.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
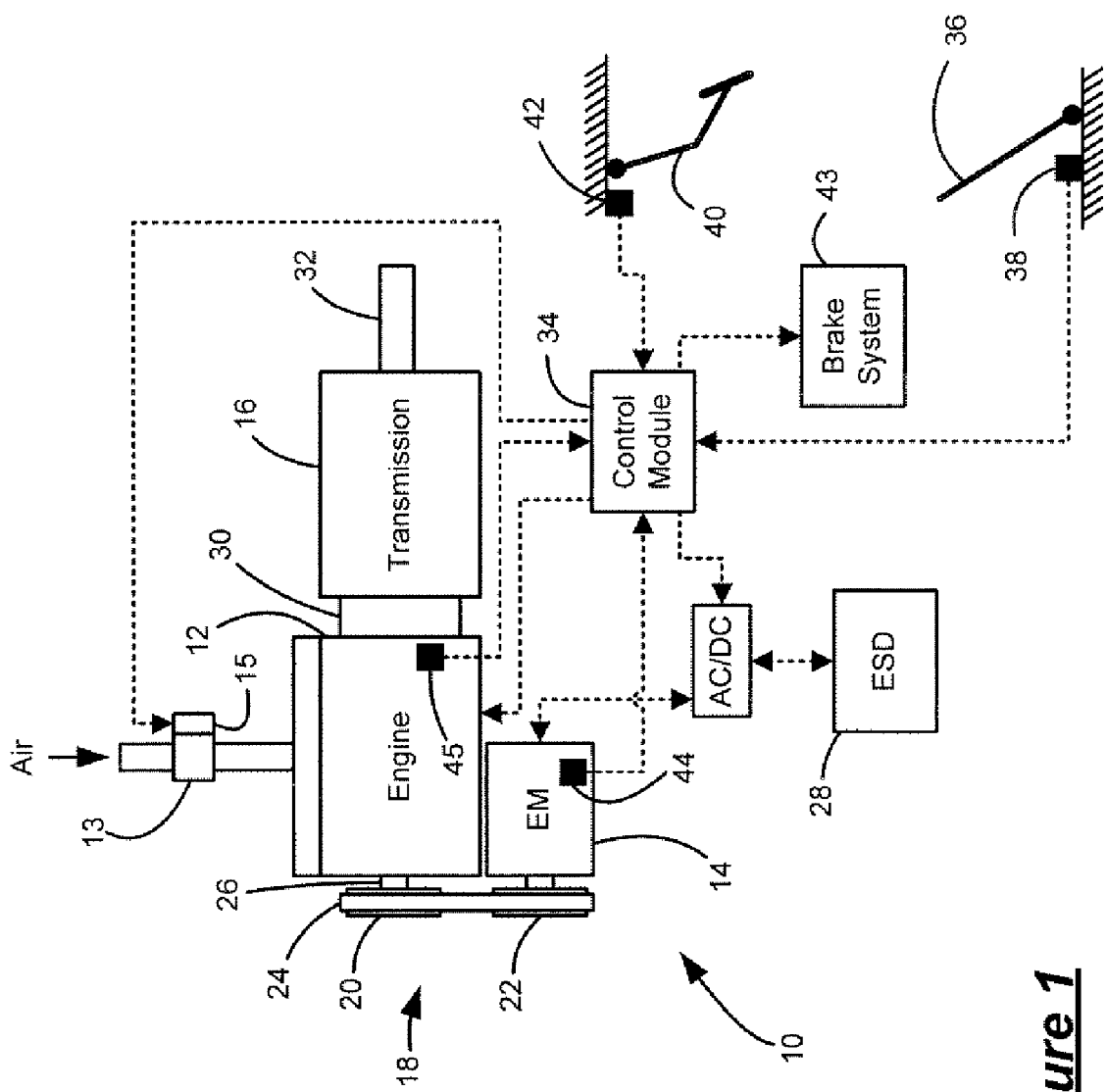
FIG. 1 is a schematic illustration of an exemplary hybrid vehicle that is operated based on the crankshaft stop positioning control of the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary hybrid vehicle 10 includes an engine 12 and an electric machine 14, which drive a transmission 16. Air is drawn into the engine 12 through a throttle 13, whose position is regulated by a throttle actuator 15. The air is mixed with fuel, and the air/fuel mixture is combusted within cylinders (not shown) to generate drive torque. The electric machine 14 supplements the engine 12 to produce drive torque to drive the transmission 16. In this manner, fuel efficiency is increased and emissions are reduced. The engine 12 and electric machine 14 are coupled via a belt-alternator-starter (BAS) system 18. More specifically, the electric machine 14 operates as a starter (i.e., motor) and an alternator (i.e., generator) and is coupled to the engine 12 through a belt and pulley system. The engine 12 and the electric machine 14 include pulleys 20, 22, respectively, that are coupled for rotation by a belt 24. The pulley 20 is coupled for rotation with a crankshaft 26 of the engine 12.

In one mode, the engine 12 drives the electric machine 14 to generate power used to recharge an energy storage device (ESD) 28. In another mode, the electric machine 14 drives the engine 12 using energy from the ESD 28. The ESD 28 can include, but is not limited to, a battery or a super-capacitor.

Alternatively, the BAS system 18 can be replaced with a flywheel-alternator-starter (FAS) system (not shown), which includes an electric machine operably disposed between the engine and the transmission or a chain or gear system that is implemented between the electric machine 14 and the crankshaft 26.

The transmission 16 can include, but is not limited to, a manual transmission, an automatic transmission, a continuously variable transmission (CVT) and an automated manual transmission (AMT). Drive torque is transferred from the engine crankshaft 26 to the transmission 16 through a coupling device 30. The coupling device 30 can include, but is not limited to, a friction clutch or a torque converter depending upon the type of transmission implemented. The transmission 16 multiplies the drive torque through one of a plurality of gear ratios to drive a driveshaft 32.

A control module 34 regulates operation of the vehicle 10. The control module 34 controls fuel injection and spark to selectively activate and deactivate cylinders of the engine 12. More specifically, when the vehicle 10 is at rest, none of the cylinders of the engine 12 are firing (i.e., are deactivated) and the engine 12 is stopped. During vehicle launch (i.e., acceleration from rest), the electric machine 14 drives the crankshaft to spin-up the engine 12 to an idle RPM and to initiate vehicle acceleration. During periods where low drive torque is needed to drive the vehicle, the engine cylinders do not fire and the valves can be deactivated. Drive torque is provided by the electric machine 14. When deactivated, fuel and spark are cut-off to the cylinders of the engine. Further, opening and closing cycles of the intake and exhaust valves can be prevented to inhibit air flow processing with the cylinders.

An accelerator pedal 36 is provided. A pedal position sensor 36 is sensitive to a position of the accelerator pedal 36 and generates a pedal position signal based thereon. A brake pedal 40 is provided. A brake pedal position sensor 42 is sensitive to a position of the brake pedal 40 and generates a pedal position signal based thereon. The control module 34 operates a brake system 43 based on the brake pedal position signal to adjust a pressure within the brake system, which in turn regulates a braking force of brakes (not shown).

An EM position sensor 44 is responsive to the rotational position of a rotor of the electric machine 14 and a rotational speed of the electric machine 14 ($RPM_{EM}$) is determined based thereon. Similarly, an engine position sensor 45 is responsive to the rotational position of the crankshaft 26 and a rotational speed of the engine 12 ($RPM_{ENG}$) is determined based thereon. The control module 34 operates the vehicle 10 based on the pedal position signals generated by the pedal position sensors 38, 42 and the signals generated by the position sensors 44, 45, as described in further detail below.

The crankshaft stop positioning (CSP) control of the present invention includes a virtual encoder that calculates the crankshaft's angular position ($\theta_{ENG}$) even at low speeds including zero RPM. The CSP control also determines a desired or target stop position ($\theta_{TRG}$) and executes a multi-plateau EM control routine that controls rotation of the crankshaft 26 at a plurality of levels and parks the crankshaft at $\theta_{TRG}$ using the virtual encoder as its input.

Positioning the engine at $\theta_{TRG}$ is based on use of position and speed information from the engine position sensor 45, which can be provided as a 58× toothed wheel crankshaft sensor and/or a 4× camshaft sensor, and the EM position sensor 44, which can be provided as a resolver of the electric machine 14. The engine position information is used to generate a signal that represents the position of cylinder #1 (i.e., the first cylinder in the firing order) on a 720 degree scale (i.e., two crankshaft revolutions of 360 degrees each for one complete engine cycle in which all cylinders go thru a complete cycle of intake, compression, ignition and exhaust). Top-dead-center (TDC) of cylinder #1 during the compression stroke represents zero degrees.

The engine position sensor 45 can not be used to determine the RPM and position below a low value of RPM (e.g., approximately 100 RPM) or in the reverse direction. Rotation of the crankshaft in the reverse direction can be detected by the control module 34, but the rotation appears the same as the rotation in the forward direction. The EM position sensor 44 can determine the EM position and $RPM_{EM}$ down to zero RPM. Because the electric machine 14 and the engine 12 are coupled by a belt of fixed ratio, $RPM_{EM}$ and the EM position can be used to determine $RPM_{ENG}$ and engine position below the point where engine position sensor 45 no longer detects rotation, as well as allow rotation of the crankshaft in the reverse direction to appear to the control module 34 as rotation different than rotation in the forward direction.

The EM position sensor 44, unlike the engine position sensor 45, has bi-directional rotation sensing capability (i.e., reverse, or rock-back rotation of the crankshaft is detectable). When the EM position sensor detects movement in the reverse direction and the engine position sensor 45 signal is still able to detect movement, the delta of this movement is determined, but the detected movement deltas are subtracted rather than added to the current $\theta_{ENG}$ value. Also, this reverse detection capability can be used to update the final stop position of the crankshaft 26 when the engine position sensor 45 stops generating a signal and engine movement is still present. A delta of EM position on a scale of 0 to 360 degrees, rather than a delta of running crank position sensor pulses, can be determined and based on the ratio of the belt, a delta of $\theta_{ENG}$ can be determined and this amount can be added or subtracted from the $\theta_{ENG}$ value depending on the detection of a forward or a reverse direction.

The CSP control of the present invention implements the engine position sensor 45 to determine $\theta_{ENG}$ of cylinder #1 on the 720 degree scale until the engine position sensor 45 no longer generates a usable signal. If the EM position sensor 44 detects the reverse direction at RPMs where the engine position sensor 45 signal is still usable, this is taken into account when determining $\theta_{ENG}$ from the engine position sensor 45, as described above. When the engine position sensor 45 no longer generates a usable signal (e.g., at very low engine speed), the EM position sensor signal can be used to continue to determine $\theta_{ENG}$. At low engine speeds (e.g., less than 100 RPM), where the engine position sensor 45 can not be used to determine engine speed, $RPM_{EM}$ is monitored as it approaches 0 RPM, instead of $EPM_{ENG}$. When $\theta_{ENG}$ approaches $\theta_{TRG}$, the EM is braked which stops movement of the engine 12 until $RPM_{EM}$ is 0 RPM, as described in further detail below.

Figure 2:
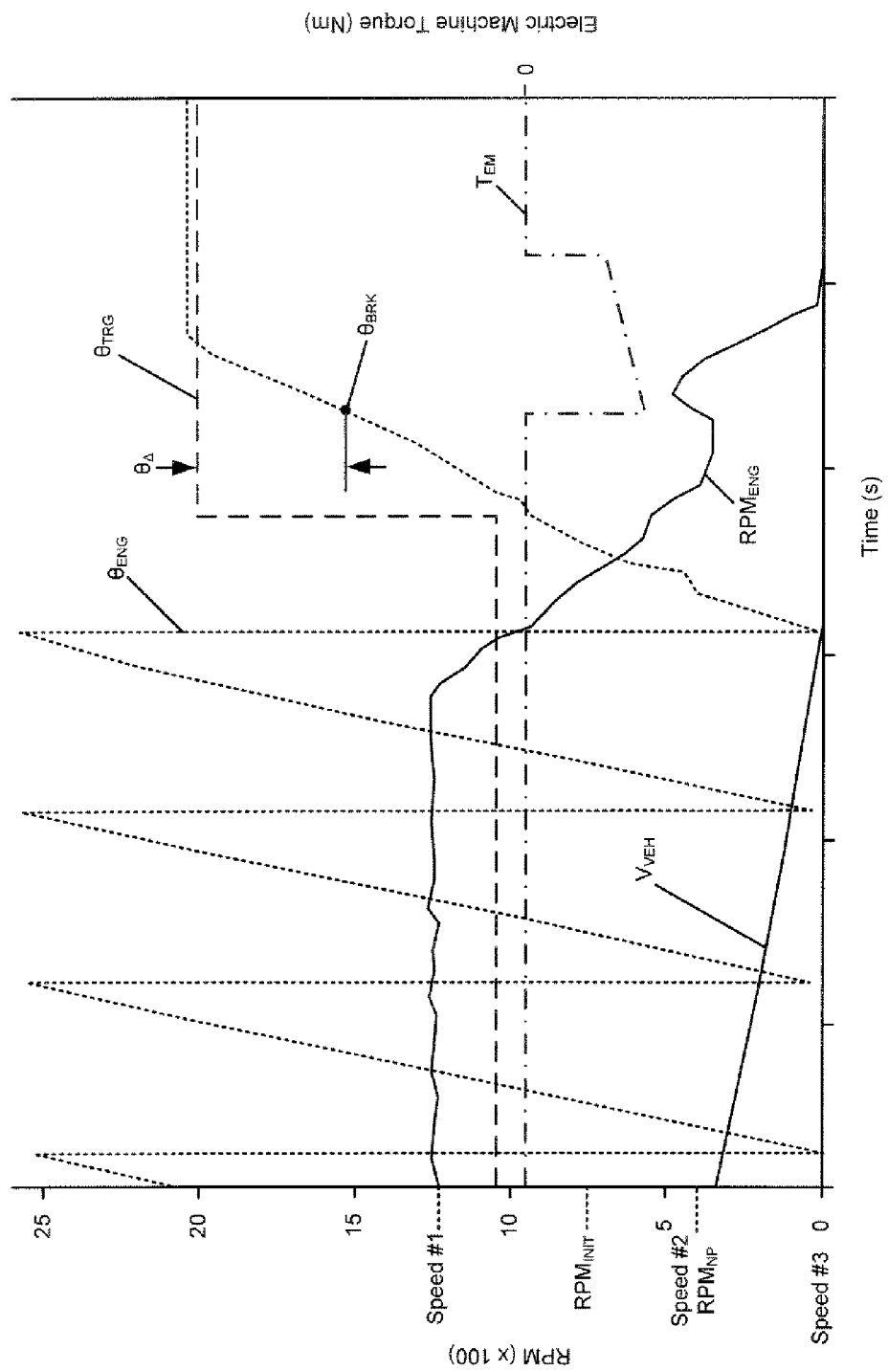
FIG. 2 is a graph illustrating exemplary vehicle operating parameter traces during a crankshaft stop positioning cycle in accordance with the present invention.

Referring now to FIG. 2, the CSP control will be described in further detail. Once HEOff is commanded the CSP control determines $\theta_{TRG}$. More specifically, when the engine is ready to be stopped, the CSP control executes the multi-plateau electric machine control. During the first plateau, the electric machine 14 is used to control the crankshaft speed to $RPM_{ML}$ (e.g. 500 $RPM_{ENG}$). $RPM_{ML}$ is the speed used to draw down manifold absolute pressure (MAP) and to take up driveline lash. Accordingly, the first plateau phase minimizes driveline lash to improve the following engine restart smoothness. The $RPM_{ENG}$ drop to $RPM_{ML}$ is also performed with fuel off and the throttle closed, thereby reducing MAP. Because the cylinder pressures are reduced during the first plateau phase, the compression disturbance and electric machine motoring torque during the ensuing engine stop is also reduced. The throttle remains closed until the engine 12 is stopped, thereby trapping the vacuum. In this manner, the amount of engine rock back during crankshaft parking is minimized. Control during the first plateau also allows for the same starting conditions of the engine and MGU for control from speed #1 to speed #2 to speed #3 which allows for consistency across HEOffs.

$\theta_{TRG}$ is calculated between the first and second plateaus, speed #1 and speed #2, respectively. More specifically, the $\theta_{TRG}$ calculation is initiated when $RPM_{ENG}$ drops below a threshold RPM ($RPM_{INIT}$) (e.g., 750 RPM). This is based on the current $\theta_{ENG}$ and can be one of a plurality of locations (e.g., 4 locations for a 4 cylinder engine), to provide one stop position per quadrant. For example, for an exemplary 4 cylinder engine, if $\theta_{TRG}$ is determined to be 85 degrees before TDC (BTDC) of any cylinder in its compression stroke, and given that 0 degrees is TDC of cylinder #1 compression, 180 degrees is TDC of cylinder #3 compression, 360 degrees is TDC of cylinder #4 compression, and 540 degrees is TDC of cylinder #2 compression (i.e., firing order is 1-3-4-2), then the stop positions would be 635 degrees, 95 degrees, 275 degrees, 455 degrees, respectively.

In this manner, the engine stopping is effectively delayed by one cylinder event (i.e., 180 degrees) or until the next quadrant after determining $\theta_{TRG}$. For example, if $\theta_{ENG}$ is near 300 degrees when $RPM_{ENG}$ crosses $RPM_{INIT}$, $\theta_{TRG}$ would be that for the next cylinder in compression, or 455 degrees. Furthermore, the window of the initial cylinder to determine the next compression cylinder is limited to the first 160 degrees (e.g., a calibratable value) of the initial cylinder's compression stroke. For example, if the compression stroke of the initial cylinder in which $RPM_{INIT}$ is crossed ranges from 180 to 360 degrees, $RPM_{INIT}$ must have been crossed between 180 and 340 degrees for a $\theta_{TRG}$ of 455 degrees to be selected.

The second plateau (speed #2) is a crankshaft nudge phase (NP), during which the crankshaft 26 is motored or nudged toward a desired position in the next quadrant using the electric machine 14. During the second plateau, the electric machine 14 controls the crankshaft speed to $RPM_{NP}$, which is the nudge speed to move the crankshaft position into the next quadrant described above (i.e., to prevent the engine 12 from stopping too early). In between $RPM_{ML}$ and $RPM_{NP}$, the CSP control calculates $\theta_{TRG}$, as described above, and the electric machine 14 controls the deceleration rate of the crankshaft 26 to reduce vibration. If the crankshaft 26 is allowed to dwell in its resonance band (e.g. approximately 300 RPM), vibration can be felt by the vehicle occupants. Likewise, if the crankshaft 26 is decelerated too abruptly, powertrain mount rocking can also lead to occupant disturbance. $RPM_{NP}$ is a calibratable value and is chosen to be sufficiently high such that it enables the electric machine 14 to operate robustly enough to motor the crankshaft to the next quadrant but low enough such that it is below $RPM_{INIT}$ and after $\theta_{TRG}$ has been selected. Control of the electric machine between the first and second plateaus allows for the events of calculating $\theta_{TRG}$.

The crankshaft 26 is motored at $RPM_{NP}$ until a braking crankshaft position ($\theta_{BRK}$) is achieved, where $\theta_{BRK}$ is defined as the calibratable position delta ($\theta_A$) before the desired stop position $\theta_{TRG}$ (i.e., $\theta_{BRK} = \theta_{TRG} - \theta_A$). The third plateau is the final stop speed of zero RPM. More specifically, once $\theta_{BRK}$ has been achieved, the electric machine 14 is switched to generator mode to retard the crankshaft speed and to control both $RPM_{EM}$ and $RPM_{ENG}$ down to zero RPM. In the generator mode, the brake torque of the electric machine 14 ($T_{EM}$) is used to brake rotation of the crankshaft. $T_{EM}$ is determined as a function of the crankshaft position away from $\theta_{TRG}$ (i.e., $\theta_A$). When zero RPM is detected, the CSP control monitors a reverse rotation flag from the EM position sensor 44. When near zero RPM and at or near $\theta_{TRG}$, the electric machine braking can be calibrated to be a slight motoring before gently ramping out the electric machine torque completely. In this manner, rock back minimization is ensured. Reverse rotation is undesirable, because extra energy and time is required to reverse the backwards rotation if an engine restart is commanded.

The engine 12 is considered parked once there is no motion detected by both the engine position sensor 45 and the EM position sensor 44 for a threshold stop time ($t_{STOP}$). Once the engine 12 is deemed parked, the throttle 13 is held closed until the MAP leaks back up to the barometric pressure ($P_{BARO}$). It is desirable to maximize the time of low MAP, because the subsequent engine restart can be performed more smoothly and with less power. Once $P_{BARO}$ has been achieved, the throttle actuator 15 is relaxed back to its rest position, thereby conserving electrical energy.

The above described three plateau EM control for engine stopping is applicable when entering the routine from a deceleration fuel cut-off situation. If the engine 12 has been idling (i.e., fuel on), the CSP control is effectively a four plateau EM control, where the fueled engine speed and MAP are first stabilized before fuel is cut and $RPM_{ENG}$ is dropped to $RPM_{ML}$.

Figure 3:
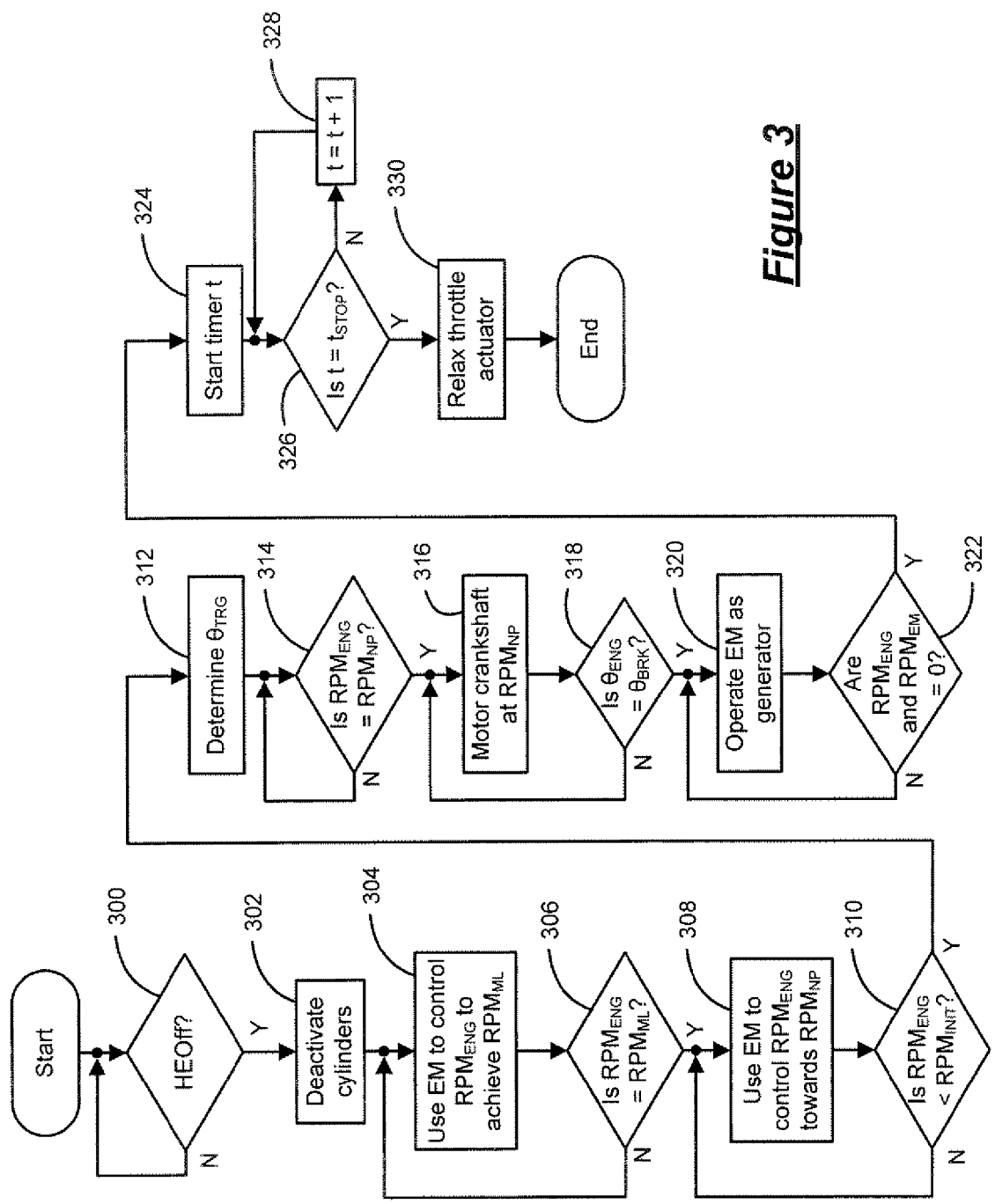
FIG. 3 is a flowchart illustrating exemplary steps executed by the crankshaft stop positioning control of the present invention.

Referring now to FIG. 3, exemplary steps executed by the CSP control will be described in detail. In step 300, control determines whether to initiate HEOff. If HEOff is not to be initiated, control loops back. If HEOff is to be initiated, control uses the electric machine 14 to control $RPM_{ENG}$ to achieve $RPM_{ML}$ in step 304. In step 306, control determines whether $RPM_{ENG}$ is equal to $RPM_{ML}$. If $RPM_{ENG}$ is not equal to $RPM_{ML}$, control loops back to step 304. If $RPM_{ENG}$ is equal to $RPM_{ML}$, control continues in step 308.

In step 308, control uses the EM to control $RPM_{ENG}$ towards $RPM_{NP}$. Control determines whether $RPM_{ENG}$ is less than $RPM_{INIT}$ in step 310. If $RPM_{ENG}$ is not less than $RPM_{INIT}$, control loops back to step 308. If $RPM_{ENG}$ is less than $RPM_{INIT}$, control determines $\theta_{TRG}$ in step 312. In step 314, control determines whether $RPM_{ENG}$ is equal to $RPM_{NP}$. If $RPM_{ENG}$ is not equal to $RPM_{NP}$, control loops back. If $RPM_{ENG}$ is equal to $RPM_{NP}$, control continues in step 316.

In step 316, control motors the crankshaft at $RPM_{NP}$ using the EM. Control determines whether $\theta_{ENG}$ is equal to $\theta_{BRK}$ in step 318. If $\theta_{ENG}$ is not equal to $\theta_{BRK}$, control loops back to step 316. If $\theta_{ENG}$ is equal to $\theta_{BRK}$, control operates the electric machine 14 as a generator to brake the rotation of the crankshaft 26 in step 320. In step 322, control determines whether $RPM_{ENG}$ and $RPM_{EM}$ are both equal to zero. If either $RPM_{ENG}$ or $RPM_{EM}$ is not equal to zero, control loops back to step 320. If both $RPM_{ENG}$ and $RPM_{EM}$ are equal to zero, control continues in step 324.

In step 324, control starts a timer t. Control determines whether t is equal to $t_{STOP}$ in step 326. If t is not equal to $t_{STOP}$, control continues in step 328. If t is equal to $t_{STOP}$, control continues in step 330. In step 328, control increments t and loops back to step 326. In step 330, control relaxes the throttle actuator 15 and control ends.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A hybrid vehicle, comprising:
   an engine having a crankshaft;
   an electric machine that selectively drives said crankshaft; and
   a control module that deactivates cylinders of said engine, that induces said electric machine to drive said crankshaft, that determines a target crankshaft position when a rotational speed of said crankshaft crosses a first threshold, that induces said electric machine to drive said crankshaft towards said target crankshaft position at a nudge rotational speed, that induces said electric machine to brake rotation of said crankshaft when a brake crankshaft position is achieved at said nudge rotational speed and that induces said electric machine to arrest rotation of said crankshaft at said target position,
   wherein said control module determines respective rotational speeds of said crankshaft and said electric machine, and relaxes a throttle actuator of said internal combustion engine when said respective rotational speeds each equal zero.

2. The hybrid vehicle of claim 1 wherein said electric machine drives said crankshaft at a lash rotational speed to minimize driveline lash in said hybrid electric vehicle and provide consistent starting conditions for subsequent steps.

3. The hybrid vehicle of claim 1 wherein said control module determines a braking torque of said electric machine based on a difference between an actual crankshaft position and said target crankshaft position during braking of said crankshaft.

4. The hybrid vehicle of claim 1 wherein said control module adjusts a torque of said electric machine to provide a slight motoring of said crankshaft when said actual crankshaft position is approximately equal to said target crankshaft position.

5. The hybrid vehicle of claim 1 wherein said control module adjusts a torque of said electric machine to provide a slight motoring of said crankshaft when said rotational speed of said crankshaft is approximately equal to zero.

6. The hybrid vehicle of claim 1 wherein said control module ramps a braking torque of said electric machine to zero when said actual crankshaft position is equal to said target crankshaft position.

7. The hybrid vehicle of claim 1 wherein said control module initiates a timer when said respective rotational speeds both equal zero, wherein said relaxing is executed upon said timer achieving a threshold time.

8. A method of regulating a crankshaft position in a hybrid electric vehicle, comprising:
   deactivating cylinders of an internal combustion engine;
   driving a crankshaft of said internal combustion engine using an electric machine;
   determining a target crankshaft position when a rotational speed of said crankshaft crosses a first threshold;
   driving said crankshaft towards said target crankshaft position at a nudge rotational speed;
   braking rotation of said crankshaft using said electric machine when a brake crankshaft position is achieved at said nudge rotational speed;
   arresting rotation of said crankshaft at said target position;
   determining respective rotational speeds of said crankshaft and said electric machine; and
   relaxing a throttle actuator of said internal combustion engine when said respective rotational speeds each equal zero.

9. The method of claim 8 wherein said step of driving said crankshaft includes driving said crankshaft at a lash rotational speed to minimize driveline lash in said hybrid electric vehicle.

10. The method of claim 8 further comprising determining a braking torque of said electric machine based on a difference between an actual crankshaft position and said target crankshaft position during said step of braking.

11. The method of claim 8 further comprising adjusting a torque of said electric machine to provide a slight motoring of said crankshaft when said actual crankshaft position is approximately equal to said target crankshaft position.

12. The method of claim 8 further comprising adjusting a torque of said electric machine to provide a slight motoring of said crankshaft when said rotational speed of said crankshaft is approximately equal to zero.

13. The method of claim 8 further comprising ramping a braking torque of said electric machine to zero while said actual crankshaft position is approaching said target crankshaft position.

14. The method of claim 8 further comprising:
   initiating a timer when said respective rotational speeds both equal zero, wherein said step of relaxing is executed upon said timer achieving a threshold time.

15. A method of regulating a crankshaft position in a hybrid electric vehicle, comprising:
   initiating a hybrid engine off mode of said hybrid electric vehicle;
   deactivating cylinders of an internal combustion engine upon executing said step of initiating;
   providing a virtual encoder to monitor respective rotational speeds of a crankshaft of an engine of said hybrid electric vehicle and an electric machine that selectively drives said engine;
   driving a crankshaft of said internal combustion engine using said electric machine;
   determining a target crankshaft position when a rotational speed of said crankshaft crosses a first threshold;
   driving said crankshaft towards said target crankshaft position at a nudge rotational speed;
   braking rotation of said crankshaft using said electric machine when a brake crankshaft position is achieved at said nudge rotational speed;
   arresting rotation of said crankshaft at said target position;
   determining respective rotational speeds of said crankshaft and said electric machine; and
   relaxing a throttle actuator of said internal combustion engine when said respective rotational speeds each equal zero.

16. The method of claim 15 wherein said virtual encoder comprises an engine position sensor and an electric machine position sensor, and can monitor respective rotational speeds of said engine and said electric motor down to zero, and can monitor reverse rotation.

17. The method of claim 15 wherein said step of driving said crankshaft includes driving said crankshaft at a lash rotational speed to minimize driveline lash in said hybrid electric vehicle and provide consistent starting conditions for subsequent steps.

18. The method of claim 15 further comprising determining a braking torque of said electric machine based on a difference between an actual crankshaft position and said target crankshaft position during said step of braking.

19. The method of claim 15 further comprising adjusting a torque of said electric machine to provide a slight motoring of said crankshaft when said actual crankshaft position is approximately equal to said target crankshaft position.

20. The method of claim 15 further comprising adjusting a torque of said electric machine to provide a slight motoring of said crankshaft when said rotational speed of said crankshaft is approximately equal to zero.

21. The method of claim 15 further comprising ramping a torque of said electric machine to zero when said actual crankshaft position is equal to said target crankshaft position.

22. The method of claim 15 further comprising:

initiating a timer when said respective rotational speeds both equal zero, wherein said step of relaxing is executed upon said timer achieving a threshold time.

* * * * *